A. T. IRVINE.
Gate Valve.
No. 232,893. Patented Oct. 5, 1880.
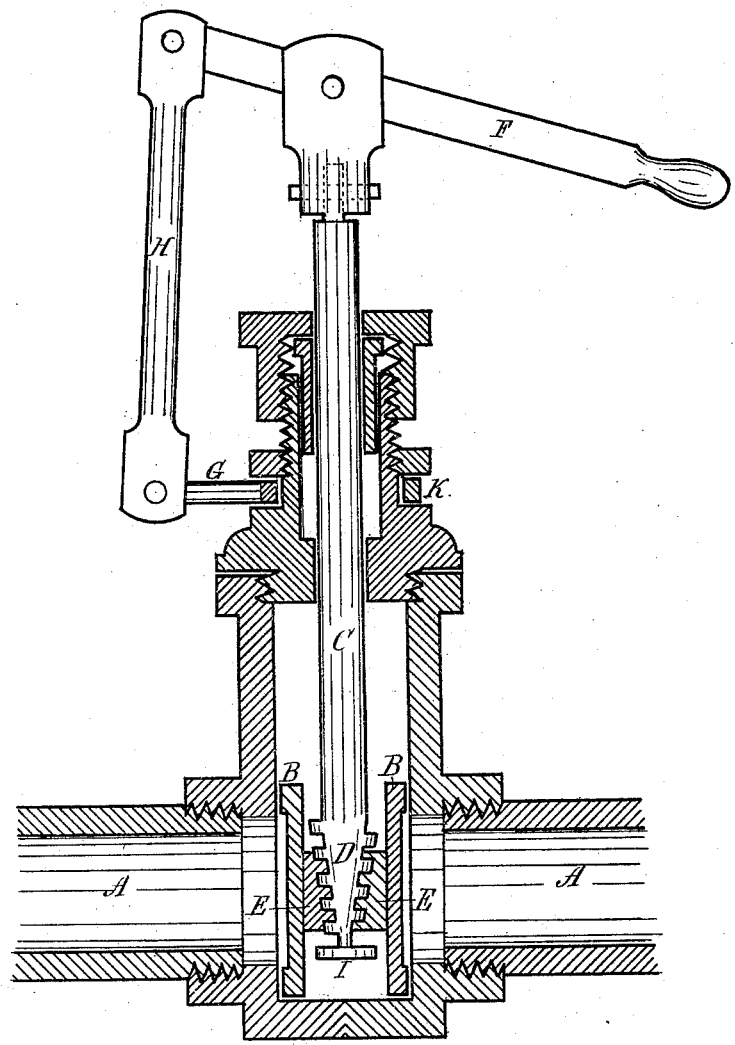

UNITED STATES PATENT OFFICE.

ARTHUR T. IRVINE, OF TITUSVILLE, PENNSYLVANIA.

GATE-VALVE.

SPECIFICATION forming part of Letters Patent No. 232,893, dated October 5, 1880.

Application filed February 24, 1880.

*To all whom it may concern:*

Be it known that I, ARTHUR T. IRVINE, of Titusville, Crawford county, Pennsylvania, have invented a new and Improved Gate-Valve, of which the following is a specification.

My invention relates to that class of valves or stop-cocks in lines of pipe used for conveying steam, water, oil, or other fluids which, when open, present no obstacle to the even flow of the fluid, and when closed are expanded and fit firmly into the seats.

My object is to expand the gates in any position desired by an even central pressure, and to do this by the manipulations of the lever used for opening and closing the valve.

The drawing represents a sectional view of the valve, together with the lever and attachments for opening and closing the same. The position shown is with the valve shut down, but before the gates are expanded, so as to entirely close the opening.

A A represent the pipe on each side of the valve; B B, the two gates; C, the valve-stem, with the conical screw D, at the lower end, engaging with and working in the two half-nuts E E, which half-nuts are firmly attached to and form part of the gates B B.

F is the handle or lever, acting on the fulcrum H and connected with the valve-stem C by a hinge-joint, by which the gates B B are raised and lowered. The fulcrum H is connected with the arm G of the collar K, which, working loosely around the packing-box of the valve-stem, allows the lever F and its attachments, together with the valve-stem C, to rotate.

It is evident that a rotation of the stem C to the right will drive the conical screw D farther between the half-nuts E E, forcing them apart and pressing the gates B B firmly against the seats.

The button or stop I, on the bottom of the valve-stem, will prevent the screw D from being withdrawn far enough to disengage with the half-nuts E E.

In operation, the gates B B being raised or lowered to the position desired by the lever F by a rotary motion of the lever, the gates B B are forced and held firmly against the seat, thus holding the valve in its position, and this whether the valve is fully open, closed, or at any position between the two points. It will be seen that the pressure of the gates against the seat is entirely relieved before moving up or down, thereby preventing wearing of the surface of the gate or seat.

If desired, the lever F, instead of being connected to the valve-stem C by a hinged joint and to the loose collar K, may be attached to a fixed fulcrum and connected to a collar around the valve-stem, the valve-stem being rotated by a separate handle or winch.

I make no claim for raising and lowering the gates by means of the lever F, nor for the device for connecting the gates B B with the stem C by means of the threads of a screw on the stem engaging with the nuts on the valve.

I claim as my invention—

1. As a device for opening and closing a gate-valve, the valve-stem C, connected by a hinge-joint to the lever F, fulcrum H, and loose collar K, the whole working in combination, substantially as described, and for the purposes herein set forth.

2. A gate-valve constructed of the gates B B, conical screw D, engaging with and acting on the half-nuts E E, valve-stem C, lever F, fulcrum H, and loose collar K, the whole working in combination, substantially as described, and for the purposes herein set forth.

ARTHUR T. IRVINE.

Witnesses:
JNO. S. WILLIARD,
SAMUEL GRUMBINE.